US008116935B2

United States Patent
Kim

(10) Patent No.: US 8,116,935 B2
(45) Date of Patent: Feb. 14, 2012

(54) FAILURE DETECTING METHOD FOR STEERING ANGLE SENSOR

(75) Inventor: Jong Wook Kim, Seoul (KR)

(73) Assignee: Mando Corpration, Gyeonggi-do (KR)

(*) Notice: Subject to any disclaimer, the term of this patent is extended or adjusted under 35 U.S.C. 154(b) by 341 days.

(21) Appl. No.: 12/563,044

(22) Filed: Sep. 18, 2009

(65) Prior Publication Data

US 2010/0076643 A1    Mar. 25, 2010

(30) Foreign Application Priority Data

Sep. 24, 2008 (KR) .................. 10-2008-0093706

(51) Int. Cl.
*G01F 19/00* (2006.01)

(52) U.S. Cl. ........................................ 701/34

(58) Field of Classification Search .......... 701/29, 701/34, 41, 43, 63, 70, 72
See application file for complete search history.

(56) References Cited

U.S. PATENT DOCUMENTS

| 4,939,654 A | * | 7/1990 | Kouda et al. | ......... 701/39 |
| 5,146,202 A | * | 9/1992 | Kashihara | ......... 340/438 |
| 5,457,632 A | * | 10/1995 | Tagawa et al. | ......... 701/43 |

FOREIGN PATENT DOCUMENTS

| KR | 2001-004410 | 1/2001 |
| KR | 10-2006-0014466 A | 2/2006 |

* cited by examiner

*Primary Examiner* — Kim T Nguyen
(74) *Attorney, Agent, or Firm* — McDermott Will & Emery LLP

(57) ABSTRACT

Disclosed herein is a failure detecting method for a steering angle sensor that detects a turning angle, turning direction and central position of a steering wheel of a vehicle. It is determined whether the steering angle sensor has failed using traveling behavior of the vehicle, and therefore, the failure of the steering angle sensor is effectively detected even when the steering angle center or the turning angle is incorrectly detected. Also, it is determined whether the steering angle sensor has failed using characteristic differences among pulse signals of the sensor, and therefore, three pulse signals output from the steering angle sensor are effectively detected although any of the pulse signals has failed, whereby the vehicle is stably traveled.

3 Claims, 6 Drawing Sheets

FAILURE DETECTING METHOD FOR STEERING ANGLE SENSOR

CROSS-REFERENCE TO RELATED APPLICATION

This application claims the benefit of Korean Patent Application No. 2008-0093706, filed on Sep. 24, 2008 in the Korean Intellectual Property Office, the disclosure of which is incorporated herein by reference.

BACKGROUND

1. Field

Embodiments of the present invention relate to a failure detecting method for a steering angle sensor that detects a turning angle, turning direction and central position of a steering wheel of a vehicle.

2. Description of the Related Art

Generally, a plurality of slits are provided, at regular intervals, at a rotary disc operatively connected to a steering wheel such that the rotary disc rotates when the steering wheel is turned to detect a turning angle and turning direction of the steering wheel. A steering angle sensor is disposed adjacent to a position corresponding to the slits to detect whether light has passed through the slits and to count how many times the light has passed through the slits using two photo couplers to output pulse signals having the same waveform and different phases during manipulation of the steering wheel, thereby detecting the turning angle and turning direction of the steering wheel.

Since the steering wheel makes two or three left and right turns, a central position detecting slit is also provided at the rotary disc to detect a central position of the steering wheel. The steering angle sensor is disposed adjacent to a position corresponding to the central position detecting slit to determine whether light has passed through the slit using a third photo coupler to output a pulse signal during manipulation of the steering wheel, thereby detecting the central position of the steering wheel.

If any one of the three pulse signals output from the steering angle sensor has failed with the result that no pulse is generated, however, the vehicle may not be stably traveled due to incorrect steering angle information.

SUMMARY

Therefore, it is an aspect of the present invention to provide a failure detecting method for a steering angle sensor to effectively detect whether the steering angle sensor has failed using traveling behavior of a vehicle.

It is another aspect of the present invention to provide a failure detecting method for a steering angle sensor to effectively detect whether the steering angle sensor has failed using characteristic differences among pulse signals of the sensor.

Additional aspects of the invention will be set forth in part in the description which follows and, in part, will be obvious from the description, or may be learned by practice of the invention.

In accordance with one aspect of the present invention, a failure detecting method for a steering angle sensor including a rotary disc operatively connected to a steering wheel of a vehicle such that the rotary disc rotates when the steering wheel is turned, a plurality of slits formed at an outer circumference of the rotary disc such that the slits are arranged concentrically with a rotation center of the rotary disc, a central position detecting slit formed at the rotary disc separately from the slits, a first sensor unit and a second sensor unit provided to correspond to two of the slits, and a third sensor unit provided to correspond to the central position detecting slit, the failure detecting method for the steering angle sensor based on a first pulse signal, a second pulse signal and a third pulse signal output from the first sensor unit, the second sensor unit and the third sensor unit, includes detecting wheel velocity, yaw rate and lateral acceleration of the vehicle, determining whether the vehicle is being turned based on the detected wheel velocity, yaw rate and lateral acceleration, determining whether a steering angle decided by the first pulse signal and the second pulse signal during turning of the vehicle is less than a predetermined angle when it is determined that the vehicle is being turned and determining that the first sensor unit and the second sensor unit have failed when the steering angle is less than the predetermined angle, and determining whether the third pulse signal is phase-changed during turning of the vehicle when it is determined that the vehicle is being turned and determining that the third sensor unit has failed when the third pulse signal is not phase-changed.

The failure detecting method may further include determining that the second sensor unit has failed when the first pulse signal is phase-changed but the second pulse signal is not phase-changed in a section in which the third pulse signal is phase-changed.

The failure detecting method may further include determining that the first sensor unit has failed when the second pulse signal is phase-changed but the first pulse signal is not phase-changed in a section in which the third pulse signal is phase-changed.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
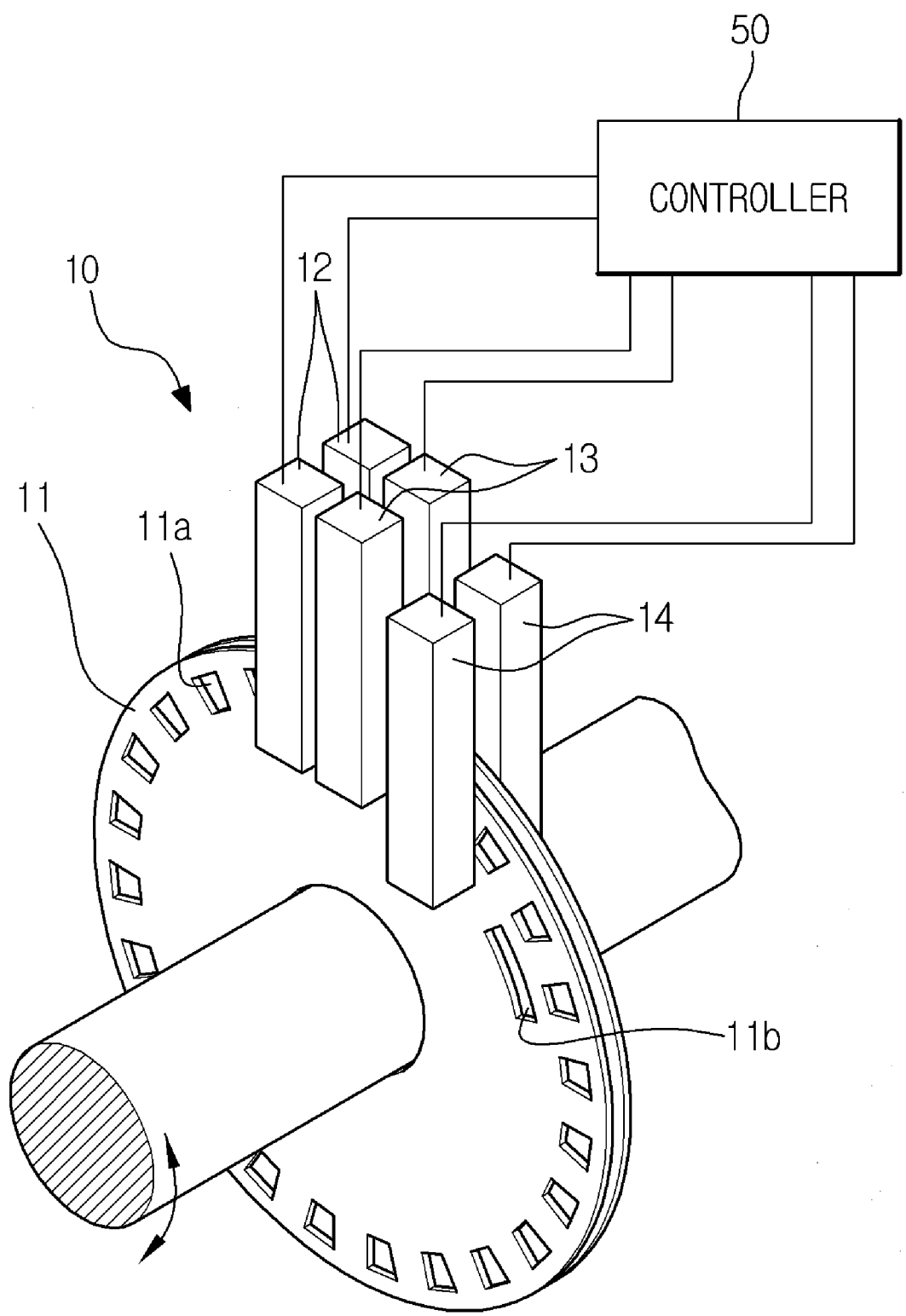
FIG. 1 is a perspective view of a steering angle sensor to which an embodiment of the present invention is applied.

Reference will now be made in detail to the embodiments of the present invention, examples of which are illustrated in the accompanying drawings, wherein like reference numerals refer to like elements throughout.

FIG. 1 is a perspective view of a steering angle sensor 10 to which an embodiment of the present invention is applied. As shown in FIG. 1, the steering angle sensor 10 includes a rotary disc 11 rotatably mounted to a rotary shaft connected to a steering wheel, a first sensor unit 12 and a second sensor unit 13 provided at the rotary disc 11 to detect a turning angle and a turning direction of the steering wheel, and a third sensor unit 14 provided at the rotary disc 11 to detect a central position of the steering wheel.

The rotary disc 11 is provided at a portion adjacent to the outer circumferential edge thereof with a plurality of slits 11a arranged along the outer circumferential edge at regular intervals. Inside the outer circumferential edge is provided a central position detecting slit 11b to detect a central position of the steering wheel. The slits 11a have the same circumferential width and uniform pitch angles. On the other hand, the slit 11b has a greater circumferential width than each of the slits 11a.

The first sensor unit 12 and the second sensor unit 13 are disposed above and below the slits 11a while being spaced apart from each other. The third sensor unit 14 is disposed above and below the slit 11b.

The first sensor unit 12 and the second sensor unit 13 each include a light emitting element and a light receiving element. The light emitting elements and the light receiving elements are disposed such that the slits 11a of the rotary disc 11 are located between the light emitting elements and the light receiving elements. When the light emitting elements communicate with the light receiving elements through the slits 11a, light emitted from the light emitting elements reaches the light receiving elements through the slits 11a. In this case, the first sensor unit 12 and the second sensor unit 13 output pulse signals of "1," which indicates a high level H. On the other hand, when the light emitting elements do not communicate with the light receiving elements through the slits 11a, light emitted from the light emitting elements does not reach the light receiving elements. In this case, the first sensor unit 12 and the second sensor unit 13 output pulse signals of "0," which indicates a low level L.

The third sensor unit 14 also includes a light emitting element and a light receiving element. The light emitting element and the light receiving element are disposed such that the slit 11b of the rotary disc 11 is located between the light emitting element and the light receiving element. Unlike the first sensor unit 12 and the second sensor unit 13, the third sensor unit 14 outputs a pulse signal of "0," which indicates the low level L, when the light emitting element communicates with the light receiving element through the slit 11b. When the light emitting element does not communicate with the light receiving element through the slit 11b, the third sensor unit 14 outputs a pulse signal of "1," which indicates the high level H.

Pulse signals output from the first sensor unit 11, the second sensor unit 12, and the third sensor unit 13 are transmitted to a controller 50 electrically connected to the steering angle sensor 10. The controller 50 detects a turning angle, a turning direction and a central position of the steering wheel based on the pulse signals. In addition, the controller 50 determines the failure of the steering angle sensor 10 based on the pulse signals.

When the rotary shaft of the steering wheel is rotated, the rotary disc 11 rotates, and the slits 11a located between the light emitting elements and the light receiving elements of the first sensor unit 12 and the second sensor unit 12 are detected, with the result that the turning angle and the turning direction of the steering wheel are detected.

That is, when the slits 11a of the rotary disc 11 are located between the light emitting elements and the light receiving elements, light emitted from the light emitting elements reaches the light receiving elements through the slits 11a. On the other hand, the portions of the rotary disc 11 where the slits 11a are not formed are located between the light emitting elements and the light receiving elements, light emitted from the light emitting elements does not reach the light receiving elements. Consequently, the first sensor unit 12 and the second sensor unit 12 detect whether light has been transmitted and how many times light has been transmitted to detect the turning angle and the turning direction of the steering wheel.

Figure 2:
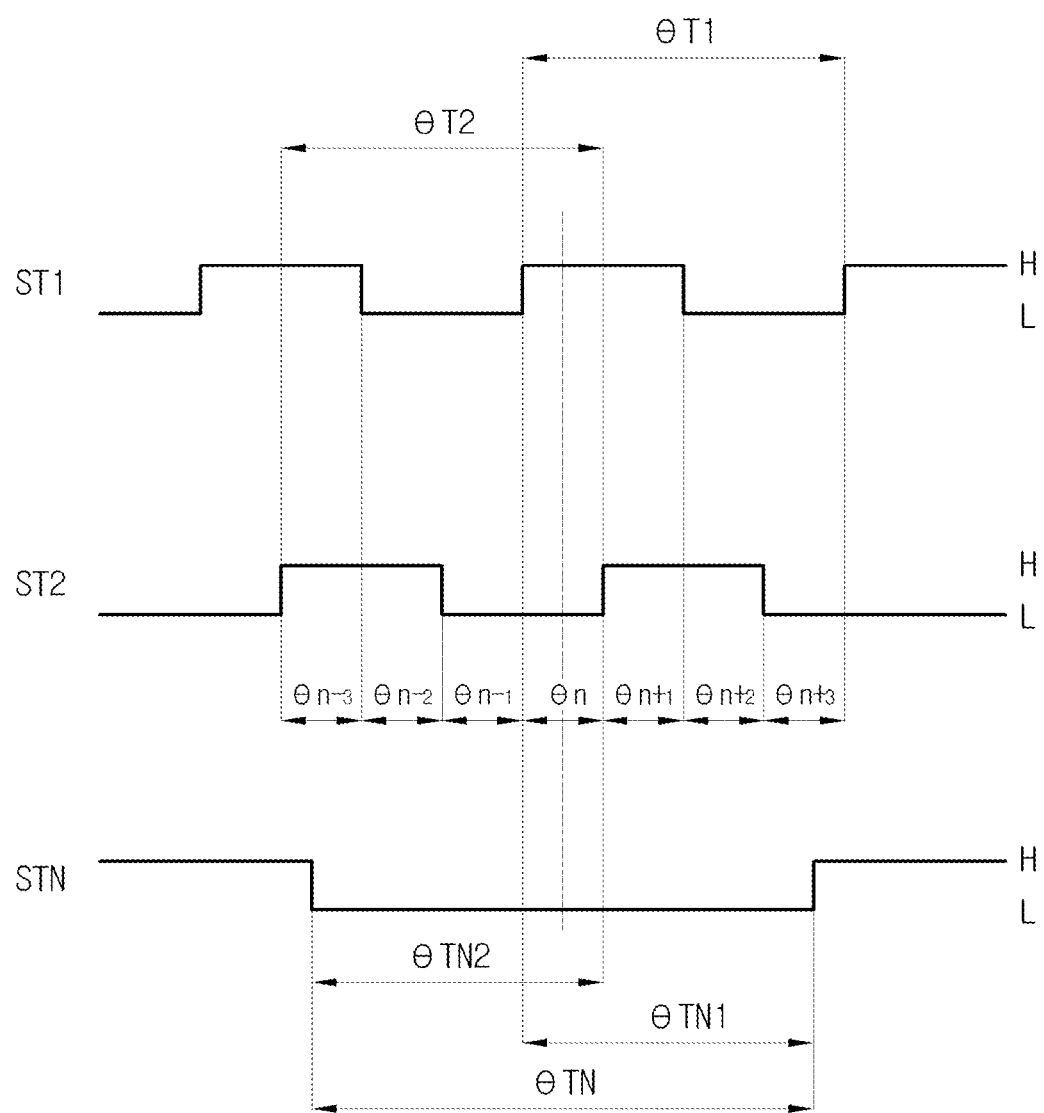
FIG. 2 illustrates waveform diagrams of pulse signals output from a first sensor unit, a second sensor unit and a third sensor unit shown in FIG. 1.

FIG. 2 illustrates waveform diagrams of pulse signals output from the first sensor unit, the second sensor unit and the third sensor unit shown in FIG. 1. In FIG. 2, ST1 indicates a pulse signal output from the first sensor unit 12, ST2 indicates a pulse signal output from the second sensor unit 13, and STN indicates a pulse signal output from the third sensor unit 14.

ST1, ST2 and STN are output signals of a general steering angle sensor 10.

When ST1 is phase-changed in a section in which STN is phase-changed (having different conditions H/L), ST2 is phase-changed at least once. That is, edge is generally counted during the calculation of a turning angle. Consequently, when a counted value of ST2 is 0 while ST1 is high in a state in which STN has different phases, which means that no down edge or rising edge has been generated at ST2, it may be determined that ST2 has failed.

Similarly, when ST2 is phase-changed in a section in which STN is phase-changed, ST1 is phase-changed at least once. That is, edge is generally counted during the calculation of a turning angle. Consequently, when a counted value of ST1 is 0 while ST2 is high in a state in which STN has different phases, which means that no down edge or rising edge has been generated at ST1, it may be determined that ST1 has failed.

Figure 3:
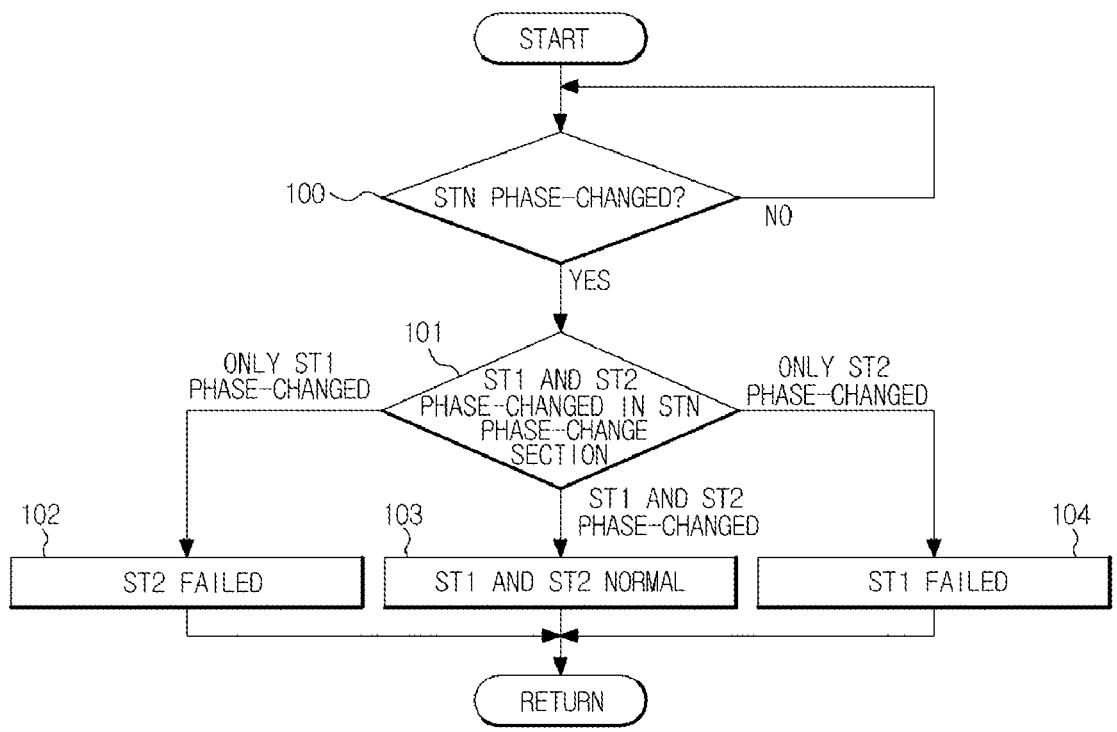
FIG. 3 is a flow chart illustrating a method of detecting ST1 or ST2 failure using pulse characteristic differences among STN, ST1 and ST2 of a steering angle sensor according to an embodiment of the present invention.
Figure 4:
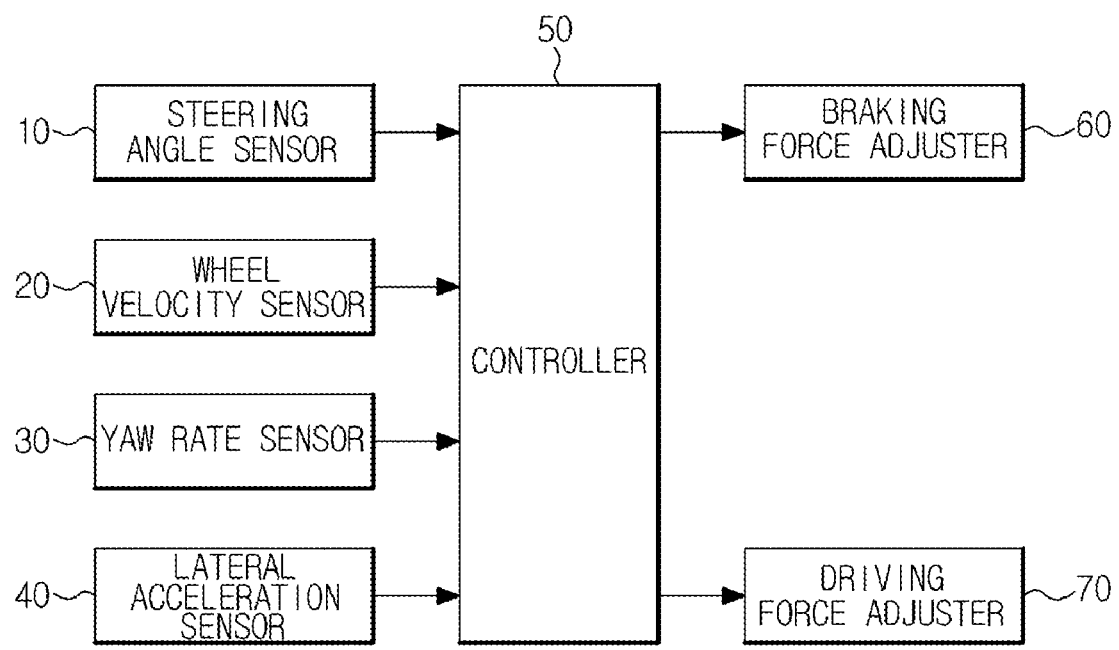
FIG. 4 is a block diagram of an electronic brake device to which an embodiment of the present invention is applied.

As shown in FIG. 3, the controller 50 determines whether STN is phase-changed (100). When STN is phase-changed, the controller 50 determines whether ST1 and ST2 are phase-changed in a section in which STN is phase-changed (101), When ST1 is phase-changed but ST2 is not phase-changed in the section in which STN is phase-changed, it is determined that ST2 has failed (102). When it is determined that ST2 has failed, which indicates failure of the second sensor unit 13, the controller 50 stores a trouble code indicating the failure of the second sensor unit 13 and informs a user of the failure of the second sensor unit 13.

When both ST1 and ST2 are phase-changed in the section in which STN is phase-changed, it is determined that ST1 and ST2 are normal (103).

When ST2 is phase-changed but ST1 is not phase-changed in the section in which STN is phase-changed, it is determined that ST1 has failed (104). When it is determined that ST1 has failed, which indicates failure of the first sensor unit 12, the controller 50 stores a trouble code indicating the failure of the first sensor unit 12 and informs a user of the failure of the first sensor unit 12.

In this embodiment, it may be determined whether ST1 and ST2 have failed only when STN is a normal pulse signal.

However, when STN is an abnormal pulse signal, which means that the third sensor unit 14 has failed, it may not be determined whether ST1 and ST2 have failed.

As will be described hereinafter, therefore, it is determined whether STN has failed using a travelling state of a vehicle according to an embodiment of the present invention.

Generally, an electronic stability program (hereinafter, referred to as an ESP system), which is an example of an electronic brake device mounted in a vehicle, appropriately controls wheels, when a driver of the vehicle encounters dangerous situations, such as tire contact limit, during driving of the vehicle, to move the vehicle in a direction intended by the driver.

To the ESP system are connected various sensors to detect behavior of the vehicle. In addition to the steering angle sensor 10 with the above-stated construction, a wheel velocity sensor to detect velocity of each wheel, a yaw rate sensor to detect yaw rate of the vehicle, and a lateral acceleration sensor to detect lateral acceleration of the vehicle are connected to the ESP system.

In an embodiment, a failure detecting apparatus for a steering angle sensor 10 includes a controller 50 to perform overall control. To the input side of the controller 50 are electrically connected a wheel velocity sensor 20 to detect velocity of each wheel, a yaw rate sensor 30 to detect yaw rate of a vehicle, and a lateral acceleration sensor 40 to detect lateral acceleration of the vehicle as well as the steering angle sensor 10. To the output side of the controller 50 are electrically connected a braking force adjuster 60 to adjust braking force of the vehicle by controlling pressure of brake liquid and a driving force adjuster 70 to adjust driving force of the vehicle by controlling engine torque.

The controller 50 detects the wheel velocity, the yaw rate and the lateral acceleration of the vehicle to determine whether the vehicle is being turned. When it is determined that the vehicle is being turned, the controller 50 determines whether STN is phase-changed during turning of the vehicle. When STN is not phase-changed, the controller 50 determines that the third sensor unit 14 has failed.

Figure 5:
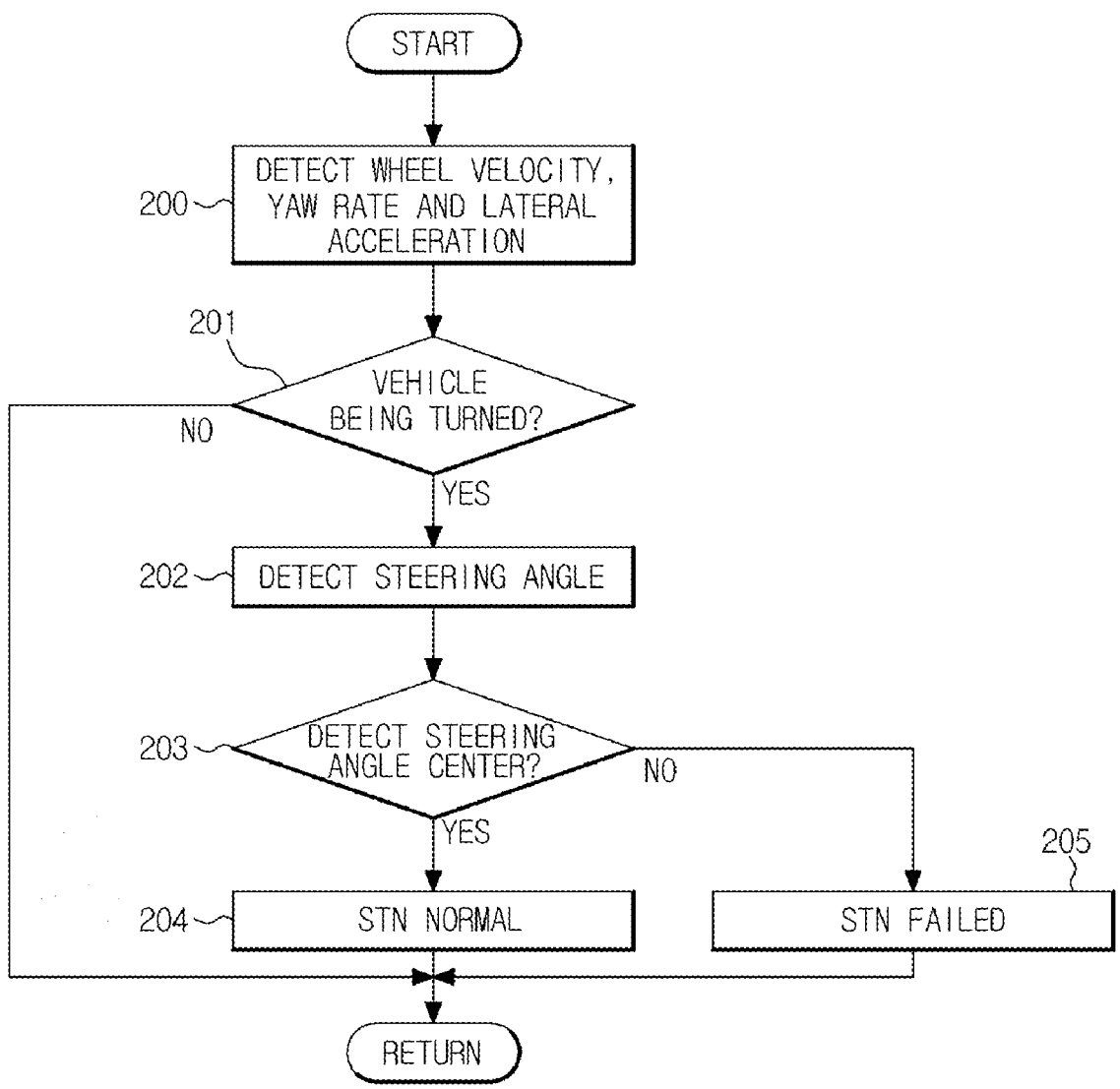
FIG. 5 is a flow chart illustrating a method of detecting STN failure of a steering angle sensor using a traveling state of a vehicle according to an embodiment of the present invention.

As shown in FIG. 5, the controller 50 detects wheel velocity, yaw rate and lateral acceleration of a vehicle through the wheel velocity sensor 20, the yaw rate sensor 30 and the lateral acceleration sensor 40 (200). Subsequently, the controller 50 determines whether the vehicle is being turned based on the detected wheel velocity, yaw rate and lateral acceleration (201). When the yaw rate and the lateral acceleration are equal to or greater than predetermined values during traveling of the vehicle, it may be determined that the vehicle is being turned.

When the vehicle is being turned left or right, a steering angle is detected by the steering angle sensor 10 (202), and it is determined whether the center of the detected steering angle has been detected (203). When the steering angle center has been detected, it is determined that STN is normal (204). When the steering angle center has not been detected, it is determined that STN has failed (205). In this case, it is determined that the third sensor unit 14 has failed, and corresponding control is performed. This means that the steering angle center has not been detected when the vehicle was turned left or right. Consequently, it is determined that an STN signal is abnormal, and therefore, trouble is detected.

The controller 50 may determine whether ST1 and ST2 have simultaneously failed in addition to STN. That is, when the vehicle is being turned, the controller 50 determines whether a steering angle decided by ST1 and ST2 during turning of the vehicle is less than a predetermined angle. When the steering angle is less than the predetermined angle, the controller 50 determines that the first sensor unit 12 and the second sensor unit 13 have failed.

Figure 6:
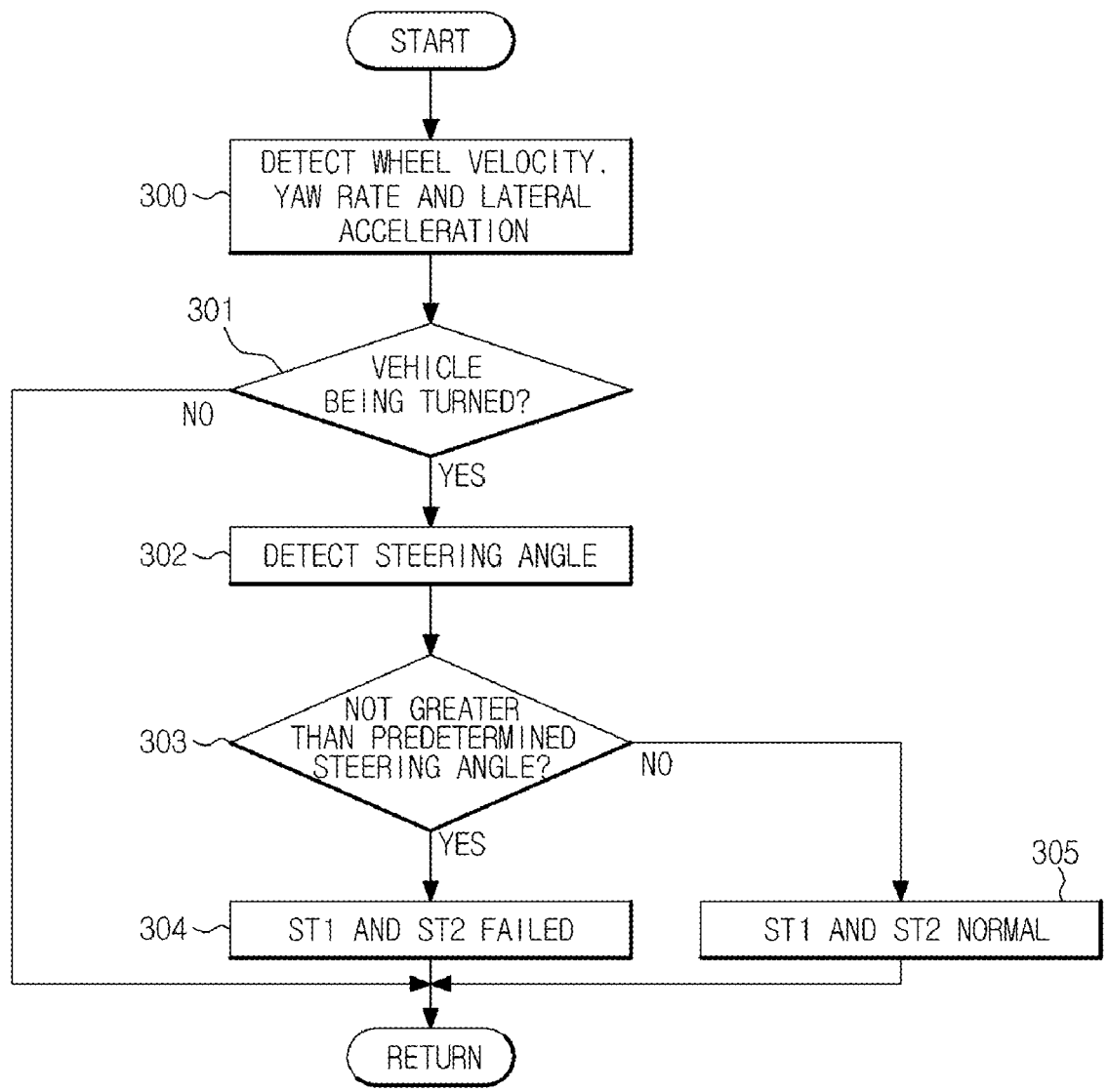
FIG. 6 is a flow chart illustrating a method of detecting ST1 or ST2 failure of a steering angle sensor using a traveling state of a vehicle according to an embodiment of the present invention.

As shown in FIG. 6, the controller 50 detects wheel velocity, yaw rate and lateral acceleration of a vehicle through the wheel velocity sensor 20, the yaw rate sensor 30 and the lateral acceleration sensor 40 (300). Subsequently, the controller 50 determines whether the vehicle is being turned based on the detected wheel velocity, yaw rate and lateral acceleration (301). When the yaw rate and the lateral acceleration are equal to or greater than predetermined values during traveling of the vehicle, it may be determined that the vehicle is being turned.

When the vehicle is being turned left or right, a steering angle is detected by the steering angle sensor 10 (302), and it is determined whether the detected steering angle is equal to or less than a predetermined steering angle (303). When the detected steering angle is equal to or less than the predetermined steering angle, it is determined that ST1 and ST2 have failed (304). In this case, it is determined that the first sensor unit 12 and the second sensor unit 13 have failed, and corresponding control is performed. This means that the predetermined steering angle has been kept when the vehicle was turned left or right. Consequently, it is determined that ST1 and ST2 signals are abnormal, and therefore, trouble is detected. On the other hand, when the detected steering angle is greater than the predetermined steering angle, it is determined that ST1 and ST2 are normal (305).

As is apparent from the above description, it is determined whether the steering angle sensor 10 has failed using traveling behavior of the vehicle, and therefore, the failure of the steering angle sensor 10 is effectively detected even when the steering angle center or the turning angle is incorrectly detected, whereby the vehicle is stably traveled.

Also, it is determined whether the steering angle sensor 10 has failed using characteristic differences among pulse signals of the sensor, and therefore, three pulse signals output from the steering angle sensor 10 are effectively detected although any of the pulse signals has failed, whereby the vehicle is stably traveled.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A failure detecting method for a steering angle sensor comprising: a rotary disc operatively connected to a steering wheel of a vehicle such that the rotary disc rotates when the steering wheel is turned; a plurality of slits formed at an outer circumference of the rotary disc such that the slits are arranged concentrically with a rotation center of the rotary disc; a central position detecting slit formed at the rotary disc separately from the slits; a first sensor unit and a second sensor unit provided to correspond to two of the slits; and a third sensor unit provided to correspond to the central position detecting slit, the failure detecting method for the steering angle sensor based on a first pulse signal, a second pulse signal and a third pulse signal output from the first sensor unit, the second sensor unit and the third sensor unit, wherein the failure detecting method comprises:

detecting wheel velocity, yaw rate and lateral acceleration of the vehicle;

determining whether the vehicle is being turned based on the detected wheel velocity, yaw rate and lateral acceleration;

determining whether a steering angle decided by the first pulse signal and the second pulse signal during turning of the vehicle is less than a predetermined angle when it is determined that the vehicle is being turned and determining that the first sensor unit and the second sensor unit have failed when the steering angle is less than the predetermined angle; and determining whether the third pulse signal is phase-changed during turning of the vehicle when it is determined that the vehicle is being turned and determining that the third sensor unit has failed when the third pulse signal is not phase-changed.

2. The failure detecting method according to claim 1, further comprising determining that the second sensor unit has failed when the first pulse signal is phase-changed but the second pulse signal is not phase-changed in a section in which the third pulse signal is phase-changed.

3. The failure detecting method according to claim 1, further comprising determining that the first sensor unit has failed when the second pulse signal is phase-changed but the first pulse signal is not phase-changed in a section in which the third pulse signal is phase-changed.

* * * * *